United States Patent
Miki (10) Patent No.: US 10,497,969 B2
(45) Date of Patent: Dec. 3, 2019

(54) FLUORIDE ION BATTERY

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 26 days.

(21) Appl. No.: 15/958,594

(22) Filed: Apr. 20, 2018

(65) Prior Publication Data

US 2018/0342763 A1    Nov. 29, 2018

(30) Foreign Application Priority Data

May 23, 2017 (JP) .................................. 2017-101730

(51) Int. Cl.
| | |
|---|---|
| *H01M 10/05* | (2010.01) |
| *H01M 4/48* | (2010.01) |
| *H01M 10/16* | (2006.01) |
| *H01M 10/0562* | (2010.01) |
| *H01M 4/485* | (2010.01) |
| *H01M 4/58* | (2010.01) |
| *H01M 6/18* | (2006.01) |
| *H01M 4/02* | (2006.01) |

(52) U.S. Cl.
CPC ....... *H01M 10/0562* (2013.01); *H01M 4/485* (2013.01); *H01M 4/582* (2013.01); *H01M 6/183* (2013.01); *H01M 10/05* (2013.01); *H01M 2004/027* (2013.01); *H01M 2004/028* (2013.01); *H01M 2300/008* (2013.01); *H01M 2300/0068* (2013.01)

(58) Field of Classification Search
None
See application file for complete search history.

(56) References Cited

U.S. PATENT DOCUMENTS

| | | |
|---|---|---|
| 2008/0034579 A1 | 2/2008 | Potanin |
| 2015/0147597 A1 | 5/2015 | Otomo et al. |

(Continued)

FOREIGN PATENT DOCUMENTS

| | | |
|---|---|---|
| JP | 2008-538649 A | 10/2008 |
| JP | 2013-120700 A | 6/2013 |

(Continued)

OTHER PUBLICATIONS

M. Anji Reddy et al. "Journal of Materials Chemistry" The Royal Society of Chemistry; Nov. 21, 2011; pp. 17059-17062; vol. 21.

(Continued)

*Primary Examiner* — Scott J. Chmielecki
(74) *Attorney, Agent, or Firm* — Sughrue Mion, PLLC (57) ABSTRACT

A main object of the present disclosure is to provide a fluoride ion battery in which reduction decomposition of a solid electrolyte is inhibited. The present disclosure achieves the object by providing a fluoride ion battery, comprising a cathode layer, an anode layer, and a solid electrolyte layer formed between the cathode layer and the anode layer; wherein the anode layer contains an anode active material having a composition represented by $La_{(1-x)}Sn_xF_{(3-x)}$, in which $0.1 \leq x \leq 0.8$; and the solid electrolyte layer contains a solid electrolyte including a crystal phase of a Tysonite structure.

3 Claims, 6 Drawing Sheets (56) References Cited

U.S. PATENT DOCUMENTS

2018/0131038 A1* 5/2018 Miki ............... C01F 17/0031
2018/0175382 A1* 6/2018 Chou ............... H01M 4/366
2018/0301764 A1* 10/2018 Chou ............... H01M 10/36
2019/0103607 A1* 4/2019 Omichi ............. H01M 4/625

FOREIGN PATENT DOCUMENTS

| JP | 2013-145758 A | 7/2013 |
| JP | 2014-2966 A | 1/2014 |
| JP | 201877987 A | 5/2018 |
| WO | 2007/146453 A2 | 12/2007 |

OTHER PUBLICATIONS

Carine Rongeat, et al., "Solid Electrolytes for Fluoride Ion Batteries: Ionic Conductivity in Polycrystalline Tysonite-Type Fluorides", ACS Applied Materials & Interfaces, American Chemical Society, Jan. 20, 2014, vol. 6, pp. 2103-2110 (8 pages total).

* cited by examiner

Example 1 : $La_{0.9}Sn_{0.1}F_{2.9}$

FIG. 7B

Example 2 : $La_{0.8}Sn_{0.2}F_{2.8}$

FIG. 7C

Example 3 : $La_{0.7}Sn_{0.3}F_{2.7}$

FIG. 7D

Example 4 : $La_{0.6}Sn_{0.4}F_{2.6}$

FIG. 7E

Example 5 : $La_{0.4}Sn_{0.6}F_{2.4}$

FIG. 7F

Example 6 : $La_{0.2}Sn_{0.8}F_{2.2}$

FIG. 8

FLUORIDE ION BATTERY

TECHNICAL FIELD

The present disclosure relates to a fluoride ion battery in which reduction decomposition of a solid electrolyte during charge is inhibited.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known.

For example, Patent Literature 1 discloses an electrochemical cell (fluoride ion battery) provided with a cathode, an anode, and an electrolyte that can conduct an anion charge carrier ($F^-$), and a fluoride of lanthanoid is exemplified as an example of a material of the anode.

Patent Literature 1 is a literature related to a liquid-based battery.

Also, Non-Patent Literature 1 discloses a fluoride ion battery using Ce as an anode active material and $La_{1-x}Ba_xF_{3-x}$ ($0 \leq x \leq 0.15$) as a solid electrolyte.

CITATION LIST

Patent Literature

Patent Literature 1: Japanese Patent Application Laid-Open (JP-A) No. 2013-145758

Non-Patent Literature

Non-Patent Literature 1: M. Anji Reddy et al., "Batteries based on fluoride shuttle", Journal Materials Chemistry, 2011, 21, P. 17059-17062, supporting information

SUMMARY OF DISCLOSURE

Technical Problem

Now, in order to improve the performance of a fluoride ion battery, $LaF_3$ is considered as one of the promising anode active material. $LaF_3$ is regarded as a viable prospect from the viewpoints such as its fluoride ion conductivity and reversibility of charge and discharge (fluorination and defluorination).

Also, a solid electrolyte having a crystal phase of a Tysonite structure (such as $La_{0.9}Ba_{0.1}F_{2.9}$) has advantages such as excellent fluoride ion conductivity.

Then, the inventor of the present disclosure has researched on a fluoride ion battery in which the two promising materials for improving the performance of a battery, that are, the combination of $LaF_3$ and the above described solid electrolyte and found out the problem that the reduction decomposition of the solid electrolyte occurred during charge.

The present disclosure is an invention made in view of the above circumstances, and the main object thereof is to provide a fluoride ion battery in which reduction decomposition of a solid electrolyte during charge is inhibited.

Solution to Problem

In order to achieve the object, the inventor of the present disclosure thoroughly researched and found out that, since $LaF_3$ and the solid electrolyte have a crystal phase of a Tysonite structure, the charge potential (defluorination potential) of $LaF_3$ is extremely close to the reduction potential (defluorination potential) of the above described solid electrolyte. In more strictly, it was found out that the charge potential of $LaF_3$ easily became the same potential as the reduction potential of the above described solid electrolyte or less.

The inventor of the present disclosure acquired the knowledge and found out that, the composition in which a Sn element was further added to $LaF_3$ allowed the charge potential of the anode active material to be higher than the reduction potential of the solid electrolyte, and the reduction decomposition of the solid electrolyte during charge was inhibited thereby. The present disclosure is an invention based on the knowledge.

Namely, the present disclosure provides a fluoride ion battery, comprising a cathode layer, an anode layer, and a solid electrolyte layer formed between the cathode layer and the anode layer; wherein the anode layer contains an anode active material having a composition represented by $La_{(1-x)}Sn_xF_{(3-x)}$, in which $0.1 \leq x \leq 0.8$; and the solid electrolyte layer contains a solid electrolyte including a crystal phase of a Tysonite structure.

According to the present disclosure, the anode layer contains the anode active material having the above described composition, so as to obtain a fluoride ion battery in which reduction decomposition of the solid electrolyte during charge is inhibited.

In the disclosure, the anode active material preferably has a composition represented by $La_{(1-x)}Sn_xF_{(3-x)}$, in which $0.3 \leq x \leq 0.8$. The reason therefor is to obtain a fluoride ion battery with excellent discharge capacity.

In the disclosure, a reduction decomposition potential of the solid electrolyte may be $-2.4$ V (vs. $Pb/PbF_2$) or less.

Advantageous Effects of Disclosure

The fluoride ion battery of the present disclosure exhibits effects such that the reduction decomposition of the solid electrolyte during charge may be inhibited.

DESCRIPTION OF EMBODIMENTS

The fluoride ion battery of the present disclosure is hereinafter described in details.

Figure 1:
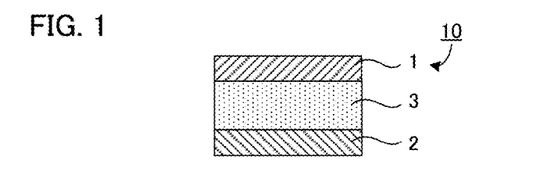
FIG. 1 is a schematic cross-sectional view illustrating an example of the fluoride ion battery of the present disclosure.

FIG. 1 is a schematic cross-sectional view illustrating an example of the fluoride ion battery of the present disclosure. Fluoride ion battery 10 shown in FIG. 1 comprises cathode layer 1, anode layer 2, and solid electrolyte layer 3 formed between cathode layer 1 and anode layer 2. Anode layer 2 contains an anode active material having a composition represented by $La_{(1-x)}Sn_xF_{(3-x)}$, in which $0.1 \leq x \leq 0.8$. Also, solid electrolyte layer 3 contains a solid electrolyte including a crystal phase of a Tysonite structure.

According to the present disclosure, the anode layer contains the anode active material having the above described composition, so as to obtain a fluoride ion battery in which reduction decomposition of the above described solid electrolyte during charge is inhibited.

As described above, regarding a fluoride ion battery in which $LaF_3$ and a solid electrolyte having a crystal phase of a Tysonite structure are used in combination, there is a problem that the solid electrolyte is reduced and decomposed during charge.

Figure 2:
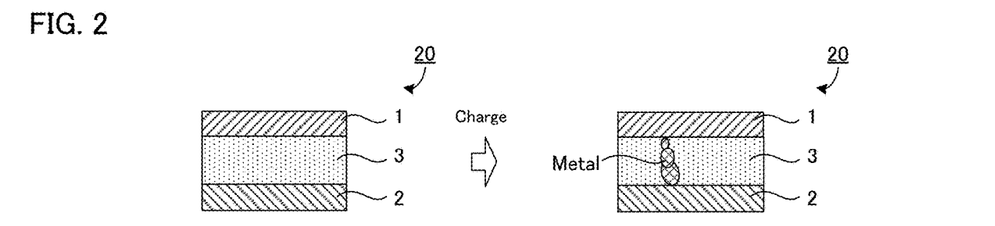
FIG. 2 is a schematic cross-sectional view explaining the reduction decomposition of a solid electrolyte.

For example, as shown in FIG. 2, during charging fluoride ion battery 10, if the reduction decomposition of the solid electrolyte proceeds locally in solid electrolyte layer 3, short circuits may possibly be caused by a metal generated from the reduction decomposition. Incidentally, FIG. 2 shows that the charge proceeds from the right side of the figure to the left side of the figure.

The inventor of the present disclosure has thoroughly researched on the reasons why the reduction decomposition of the solid electrolyte occurs and found out that, since $LaF_3$ and the solid electrolyte have a crystal phase of a Tysonite structure, the defluorination potentials of the both are extremely close to each other. In other words, the inventor has found out that, in a fluoride ion battery in which $LaF_3$ and the solid electrolyte are used in combination, the charge potential (defluorination potential) of $LaF_3$ and the reduction potential (defluorination potential) of the above described solid electrolyte are extremely close to each other. To be more exact, the inventor has found out that the charge potential of $LaF_3$ easily becomes the same potential as the reduction potential of the above described solid electrolyte or less.

The inventor of the present disclosure has acquired the knowledge and found out that the composition in which a Sn element is further added to $LaF_3$, that is, the composition represented by $La_{(1-x)}Sn_xF_{(3-x)}$, in which $0.1 \leq x \leq 0.8$ allowed the charge potential of the anode active material to be higher than the reduction potential of the solid electrolyte, and the reduction decomposition of the solid electrolyte during charge was inhibited thereby.

Figure 3:
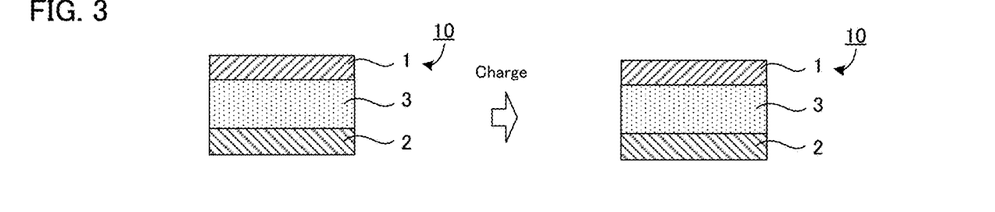
FIG. 3 is a schematic cross-sectional view explaining a presumable mechanism of inhibiting the reduction decomposition of a solid electrolyte.
Figure 4A:
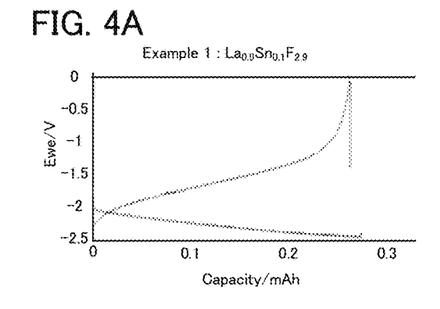
FIGS. 4A to 4F are the result of a charge and discharge test for the evaluation cell obtained in Examples 1 to 6.
Figure 4B:
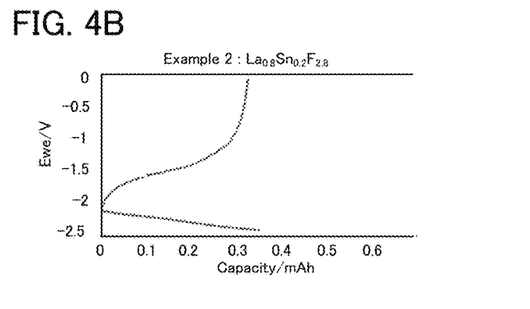
Figure 4C:
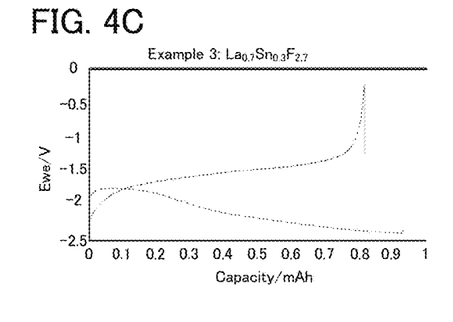
Figure 4D:
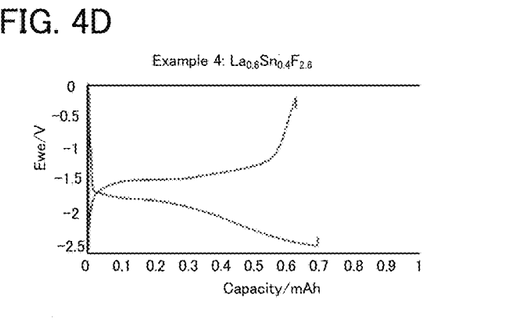
Figure 4E:
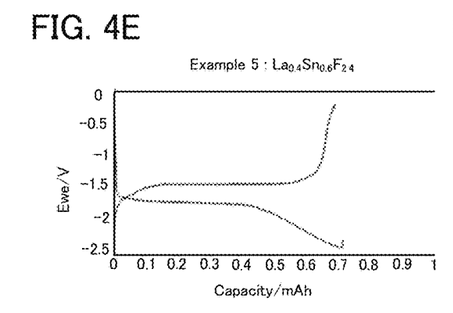
Figure 4F:
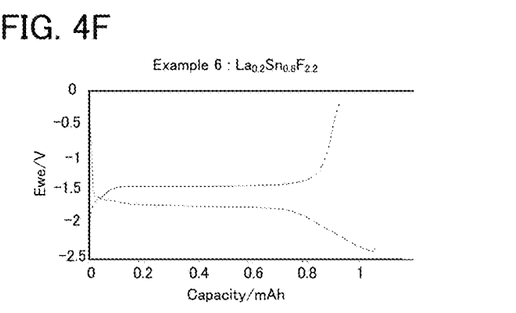

In other words, in the present disclosure, since the charge potential of the anode active material is higher than the reduction potential of the solid electrolyte, as shown in FIG. 3, during charging fluoride ion battery 10 (at the charge potential of the anode active material), the solid electrolyte included in solid electrolyte layer 3 may presumably be stably present. Incidentally, FIG. 3 shows that the charge proceeds from the right side of the figure to the left side of the figure.

The fluoride ion battery of the present disclosure is hereinafter described in each constitution.

1. Anode Layer

The anode layer in the present disclosure contains an anode active material having a composition represented by $La_{(1-x)}Sn_xF_{(3-x)}$, in which $0.1 \leq x \leq 0.8$ The anode active material has a composition represented by $La_{(1-x)}Sn_xF_{(3-x)}$, in which $0.1 \leq x \leq 0.8$. The value of x in the composition is usually 0.1 or more. The value of the x is, for example, preferably 0.3 or more. The value of the x being 0.3 or more allows the discharge capacity of the anode active material to dramatically increase. Increasing the proportion of the Sn element in the anode active material presumably allows the ion conductivity to improve. Also, the value of the x being 0.4 or more allows the cycle properties to further improve. Also, the value of the x is usually 0.8 or less.

Also, the proportions of the La element, the F element, and the Sn element in the anode active material having the above described composition may be represented by, for example, the proportions of $LaF_3$ and $SnF_2$ (in molar ratio); in particular, when the total molar ratio of $LaF_3$ and $SnF_2$ ($LaF_3+SnF_2$) is regarded as the overall anode active material, the proportions may be represented by the proportion of $SnF_2$ with respect to the overall anode active material. The proportion of $SnF_2$ with respect to the overall anode active material ($LaF_3+SnF_2$) is, usually 10% or more and 80% or less. Also, the proportion of $SnF_2$ with respect to the overall anode active material is, for example, preferably 30% or more.

The anode active material may have a crystal phase of a Tysonite structure. If the anode active material has a crystal phase of a Tysonite structure, the crystal phase of the Tysonite structure may be included as a main component. Here, the crystal phase of the Tysonite structure being the main component means that the proportion of the crystal phase of the Tysonite structure is the highest among all the components in the anode active material. The proportion of the above specified crystal phase in the anode active material may be, for example, 50 mol % or more, may be 70 mol % or more, and may be 80 mol % or more.

The anode active material may have the peak position of $2\theta$ in an XRD measurement using a CuKα ray in the vicinity of the peak position based on the later described $La_{0.9}Ba_{0.1}F_{2.9}$. In particular, the anode active material may have a peak at a position of $2\theta=24.34°\pm0.50°$, $24.88°\pm0.50°$, $27.72°\pm0.50°$, $28.66°\pm0.50°$, $34.89°\pm0.50°$, $40.23°\pm0.50°$, $43.60°\pm0.50°$, $44.73°\pm0.50°$, $50.48°\pm0.50°$, $52.39°\pm0.50°$, and $64.29°\pm0.50°$ in an XRD measurement using a CuKα ray. Also, the range of the peak position may be $\pm0.30°$, and may be $\pm0.10°$.

The anode active material may be a solid solution including a La element, a F element, and a Sn element. Also, the anode active material may be a solid solution in which $SnF_2$ is dissolved in $LaF_3$.

The charge potential (defluorination potential) of the anode active material is usually higher than the reduction potential (defluorination potential) of the later described solid electrolyte.

In the present disclosure, the charge potential of the anode active material is, for example, preferably higher than $-2.35$ V (vs. $Pb/PbF_2$), more preferably $-2.3$ V (vs. $Pb/PbF_2$) or more, particularly preferably $-2.2$ V (vs. $Pb/PbF_2$) or more, and further preferably $-2.0$ V (vs. $Pb/PbF_2$) or more. The charge potential of the anode active material may be, for example, $-1.7$ V (vs. $Pb/PbF_2$) or less, and may be $-1.8$ V (vs. $Pb/PbF_2$) or less.

Also, the difference between the charge potential of the anode active material and the reduction potential of the solid electrolyte is, for example, preferably 0.05 V or more, more preferably 0.1 V or more, particularly preferably 0.3 V or more, and further preferably 0.5 V or more.

The discharge potential (fluorination potential) of the anode active material may be, for example, $-1.50$ V (vs. $Pb/PbF_2$) or less, may be $-1.55$ V (vs. $Pb/PbF_2$) or less, and may be $-1.6$ V (vs. $Pb/PbF_2$) or less. Also, the discharge potential (fluorination potential) of the anode active material may be −1.8 V (vs. Pb/PbF$_2$) or more.

The charge potential and the discharge potential of the anode active material in the present disclosure is a value obtained from, for example, the measurement result of a charge and discharge test for an evaluation cell produced using the anode active material, and is an average value of potentials at which a plateau is confirmed in the charge and discharge curves. The method for producing the evaluation cell and the conditions for the charge and discharge test are described in the later described Example.

The fluoride ion conductivity of the anode active material in the present disclosure at 140° C. is, for example, preferably 2.5×10$^{-6}$ S/cm or more, more preferably 1×10$^{-5}$ S/cm or more, further preferably 1×10$^{-4}$ S/cm or more, and furthermore preferably 1×10$^{-3}$ S/cm or more. The reason therefor is to obtain excellent fluoride ion conductivity for the anode active material.

The fluoride ion conductivity of the anode active material is the fluoride ion conductivity of the anode active material in a form of a pressure powder molding. The specific method for measuring the fluoride ion conductivity is as follows. First, 200 mg of the anode active material in powder is put in a ceramic tube made of macole of ϕ10 mm, and uniaxial-pressure-molded at 1 ton/cm$^2$ so as to be molded in a pellet shape. After that, acetylene black (current collector) is stacked on the both surfaces of the pellet, and pressed at the pressure of 4 ton/cm$^2$. The laminated body after pressing is confined with a bolt by torque of 6N·m. Thereby, an evaluation cell is obtained. An alternating current impedance measurement is conducted for the evaluation cell in the environment under a vacuum of 10$^{-3}$ Pa and at 140° C. In the alternating current impedance measurement, the frequency is 10$^6$ Hz to 10$^{-2}$ Hz, and the voltage magnitude is 50 mA. Thereby, the fluoride ion conductivity at 140° C. is obtained.

Examples of the shape of the anode active material may include a granular shape. The average particle size ($D_{50}$) of the anode active material is, for example, in a range of 0.1 µm to 50 µm, and preferably in a range of 1 µm to 20 µm. The average particle size ($D_{50}$) of the anode active material may be measured from, for example, the result of a particle distribution measurement by a laser diffraction scattering method.

Examples of the method for producing the anode active material may include a ball milling treatment. The specific conditions for the ball milling treatment may be appropriately selected in accordance with the intended anode active material.

The thickness of the anode active material layer varies greatly with the constitution of the battery, and thus is not limited.

2. Solid Electrolyte Layer

The solid electrolyte layer in the present disclosure contains a solid electrolyte including a crystal phase of a Tysonite structure.

In the present disclosure, the solid electrolyte may include the crystal phase of a Tysonite structure as a main component or not as a main component, but the former is more preferable.

"The solid electrolyte includes the crystal phase of a Tysonite structure as a main component" means that, the proportion of the crystal phase of a Tysonite structure is the largest among the components in the solid electrolyte. The solid electrolyte may include only the crystal phase of a Tysonite structure, and may further include an additional crystal phase. Whether the solid electrolyte includes a crystal phase that has a Tysonite structure and contains a La element and an F element, as the main phase, may be confirmed by, for example, an XRD measurement (X-ray diffraction measurement).

The proportion of the crystal phase of a Tysonite structure in the solid electrolyte is, for example, preferably 70 mol % or more, more preferably 80 mol % or more, and further preferably 90 mol % or more. Also, the proportion of the crystal phase of the Tysonite structure may be, for example, 100 mol %. The proportion of the crystal phase of the Tysonite structure may be determined by, for example, a Raman spectroscopy, an NMR method (Nuclear Magnetic Resonance method), and an XPS method (X-ray Photoelectron Spectroscopy).

The solid electrolyte in the present disclosure preferably includes a crystal phase having a Tysonite structure and containing a lanthanoid (Ln) element and an F element. Also, the solid electrolyte preferably includes a crystal phase having a Tysonite structure, the crystal phase represented by $Ln_{1-y}M_yF_{3-y}$, in which Ln is a lanthanoid metal, M is an alkali earth metal, and y satisfies 0≤y≤0.2.

The Ln is a lanthanoid metal. In particular, the Ln is preferably at least one kind of La, Ce, Sm, Nd, Dy Pr, Eu, and Gd, and more preferably contains at least La. The proportion of La in the overall Ln may be, for example, 50 mol %, may be 70 mol % or more, may be 90 mol % or more, and may be 100 mol %. It is further preferable that the Ln is just La.

The M is an alkali earth metal. The M is preferably at least one kind of Ba, Ca, Sr, and Mg, and more preferably contains at least Ba. The proportion of Ba in the overall M may be, for example, 50 mol %, may be 70 mol % or more, may be 90 mol % or more, and may be 100 mol %. It is further preferable that the M is just Ba.

The value of y in the crystal phase represented by $Ln_{1-y}M_yF_{3-y}$ is usually 0 or more, may be larger than 0, and may be 0.05 or more. Also, the value of the y is usually 2 or less, and may be 0.15 or less. In the present disclosure, for example, it may be y=0.1.

The solid electrolyte preferably has a peak at a position of 2θ=24.34°±0.50°, 24.88°±0.50°, 27.72°±0.50°, 28.66°±0.50°, 34.89°±0.50°, 40.23°±0.50°, 43.60°±0.50°, 44.73°±0.50°, 50.48°±0.50°, 52.39°±0.50°, and 64.29°±0.50° in an XRD measurement using a CuKα ray. These peak positions are the peak positions based on the later described $La_{0.9}Ba_{0.1}F_{2.9}$, and the range of ±0.50° is set, so as to determine the crystal phase similar to that of $La_{0.9}Ba_{0.1}F_{2.9}$. Also, the range of the peak position may be ±0.30°, and may be ±0.10°.

The reduction potential of the solid electrolyte in the present disclosure is usually lower than the charge potential (defluorination potential) of the above described anode active material. The reduction potential of the solid electrolyte may be, for example, −2.35 V (vs. Pb/PbF$_2$) or less, may be −2.4 V (vs. Pb/PbF$_2$) or less, and may be −2.45 V (vs. Pb/PbF$_2$) or less. Also, the reduction potential of the solid electrolyte may be, for example, −2.5 V (vs. Pb/PbF$_2$) or more. The reduction potential of the solid electrolyte may be determined by, for example, cyclic voltammetry (CV).

The fluoride ion conductivity of the solid electrolyte at 200° C. is preferably 1×10$^{-4}$ S/cm or more, may be 5×10$^{-4}$ S/cm or more, and may be 1×10$^{-3}$ S/cm or more. The fluoride ion conductivity of the solid electrolyte may be determined by an alternating current impedance method.

Examples of the shape of the solid electrolyte may include a granular shape. The average particle size ($D_{50}$) of the solid electrolyte is, for example, in a range of 0.1 µm to 50 µm, and preferably in a range of 1 µm to 20 µm. The average particle size ($D_{50}$) of the solid electrolyte may be determined by, for example, the result of a particle distribution measurement using a laser diffraction scattering method.

Examples of the method for producing the solid electrolyte may include a ball milling treatment.

The specific conditions for the ball milling treatment may be appropriately selected in accordance with the intended specific crystal phase.

The thickness of the solid electrolyte layer varies greatly with the constitution of the battery, and thus is not limited.

3. Cathode Layer

The cathode layer in the present disclosure is usually a layer that contains at least a cathode active material. Examples of the cathode active material may include an active material of which defluorination reaction usually occurs during discharge. Examples of the cathode active material may include a simple substance of metal, an alloy, a metal oxide, and fluoride of these. Examples of the metal element included in the cathode active material may include Pb, Cu, Sn, In, Bi, Sb, Ni, Co, La, Ce, Mn, V, Fe, Cr, Nb, Ti, and Zn. Also, other examples of the cathode active material may include carbon materials and fluorides thereof. Examples of the carbon material may include graphite, coke, and carbon nanotube.

The cathode layer may be, for example, a layer that provides functions as both a cathode current collector and a cathode active material layer. In this case, a fluoride layer generated in the interface between the cathode layer and the solid electrolyte layer during charge of the fluoride ion battery may function as a cathode active material layer, and the cathode layer not in the reaction with fluoride ions may function as a cathode current collector.

The thickness of the cathode layer varies greatly with the constitution of the battery, and thus is not limited.

4. Other Constitutions

The fluoride ion battery of the present disclosure comprises at least the above described cathode layer, anode layer, and solid electrolyte layer, and usually further comprises a cathode current collector for collecting currents of the cathode layer and an anode current collector for collecting currents of the anode layer.

5. Fluoride Ion Battery

The fluoride ion battery of the present disclosure is usually a secondary battery, so as to be repeatedly charged and discharged and be useful as a car-mounted battery, for example. Incidentally, the secondary battery includes a use of a secondary battery as a primary battery (use for the purpose of discharging just one time after charge). Also, examples of the shape of the fluoride ion battery may include a coin shape, a laminate shape, a cylindrical shape, and a square shape. Also, a battery case to be used for the fluoride ion battery is not limited.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is described in more details with reference to Examples.

Example 1

Production of Anode Active Material $LaF_3$ and $SnF_2$ were weighed so as to be $LaF_3:SnF_2=9:1$ in the molar ratio, crashed and mixed by ball milling in the conditions of 600 rpm and for 12 hours to produce $La_{0.9}Sn_{0.1}F_{2.9}$, and thereby an anode active material was obtained.

Production of Solid Electrolyte $LaF_3$ and $BaF_2$ were weighed so as to be $LaF_3:BaF_2=9:1$ in the molar ratio, and crashed and mixed by ball milling in the conditions of 600 rpm and for 12 hours. After that, the obtained mixture was heat-treated in the conditions of, in an Ar atmosphere, at 600° C. and for 10 hours to obtain $La_{0.9}Ba_{0.1}F_{2.9}$.

Production of Evaluation Cell

In a glove box, $La_{0.9}Ba_{0.1}F_{2.9}$ was crushed. The powder of $La_{0.9}Ba_{0.1}F_{2.9}$ of 200 mg and an anode active material of 100 mg were stacked and subjected to pressure powder molding so as to obtain a pellet. A Pb foil (cathode) and a Pt foil (anode current collector) are respectively placed on the upper and bottom surfaces of the obtained pallet and pressed so as to obtain an evaluation cell.

Example 2

Except that $LaF_3$ and $SnF_2$ were weighed so as to be $LaF_3:SnF_2=8:2$ in the molar ratio, the materials were crushed and mixed in the same conditions as in Example 1 to produce $La_{0.8}Sn_{0.2}F_{2.8}$, and thereby an anode active material was obtained. Also, an evaluation cell was obtained in the same manner as in Example 1 except that the obtained anode active material was used.

Example 3

Except that $LaF_3$ and $SnF_2$ were weighed so as to be $LaF_3:SnF_2=7:3$ in the molar ratio, the materials were crushed and mixed in the same conditions as in Example 1 to produce $La_{0.7}Sn_{0.3}F_{2.7}$, and thereby an anode active material was obtained. Also, an evaluation cell was obtained in the same manner as in Example 1 except that the obtained anode active material was used.

Example 4

Except that $LaF_3$ and $SnF_2$ were weighed so as to be $LaF_3:SnF_2=6:4$ in the molar ratio, the materials were crushed and mixed in the same conditions as in Example 1 to produce $La_{0.6}Sn_{0.4}F_{2.6}$, and thereby an anode active material was obtained. Also, an evaluation cell was obtained in the same manner as in Example 1 except that the obtained anode active material was used.

Example 5

Except that $LaF_3$ and $SnF_2$ were weighed so as to be $LaF_3:SnF_2=4:6$ in the molar ratio, the materials were crushed and mixed in the same conditions as in Example 1 to produce $La_{0.4}Sn_{0.6}F_{2.4}$, and thereby an anode active material was obtained. Also, an evaluation cell was obtained in the same manner as in Example 1 except that the obtained anode active material was used.

Example 6

Except that $LaF_3$ and $SnF_2$ were weighed so as to be $LaF_3:SnF_2=2:8$ in the molar ratio, the materials were crushed and mixed in the same conditions as in Example 1 to produce $La_{0.2}Sn_{0.8}F_{2.2}$, and thereby an anode active material was obtained. Also, an evaluation cell was obtained in the same manner as in Example 1 except that the obtained anode active material was used.

Comparative Example

An evaluation cell was obtained in the same manner as in Example 1 except that $LaF_3$ was used as the anode active material for Comparative Example.

The materials of each layer in the evaluation cells obtained in Examples 1 to 6 and Comparative Example are shown in Table 1.

TABLE 1

| | Cathode layer | Solid electrolyte layer | Anode layer | Anode current collector |
|---|---|---|---|---|
| Example 1 | Pb | $La_{0.9}Ba_{0.1}F_{2.9}$ | $La_{0.9}Sn_{0.1}F_{2.9}$ | Pt |
| Example 2 | Pb | $La_{0.9}Ba_{0.1}F_{2.9}$ | $La_{0.8}Sn_{0.2}F_{2.8}$ | Pt |
| Example 3 | Pb | $La_{0.9}Ba_{0.1}F_{2.9}$ | $La_{0.7}Sn_{0.3}F_{2.7}$ | Pt |
| Example 4 | Pb | $La_{0.9}Ba_{0.1}F_{2.9}$ | $La_{0.6}Sn_{0.4}F_{2.6}$ | Pt |
| Example 5 | Pb | $La_{0.9}Ba_{0.1}F_{2.9}$ | $La_{0.4}Sn_{0.6}F_{2.4}$ | Pt |
| Example 6 | Pb | $La_{0.9}Ba_{0.1}F_{2.9}$ | $La_{0.2}Sn_{0.8}F_{2.2}$ | Pt |
| Comparative Example | Pb | $La_{0.9}Ba_{0.1}F_{2.9}$ | $LaF_3$ | Pt |

Evaluation

Charge and Discharge Test

Figure 5A:
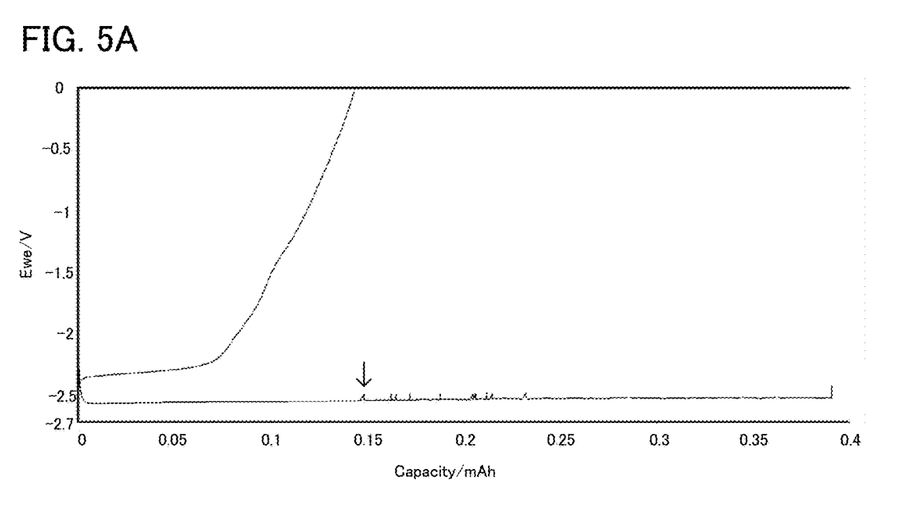
FIGS. 5A to 5B are the result of a charge and discharge test for the evaluation cell obtained in Comparative Example.
Figure 5B:
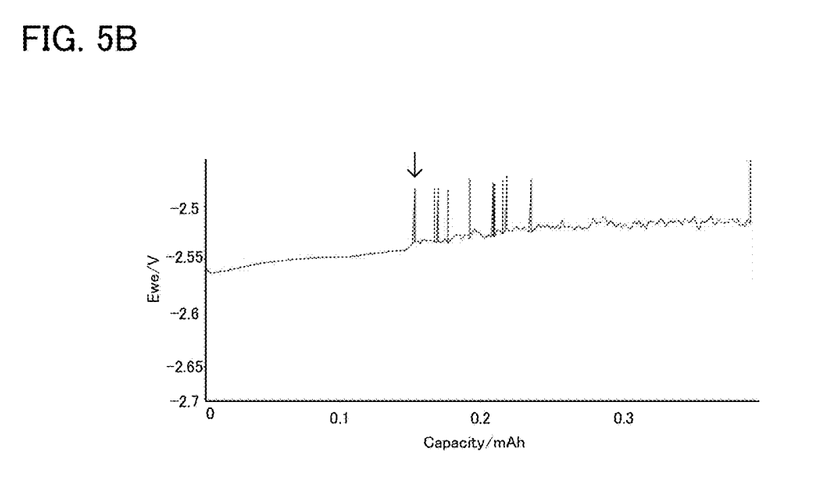

A charge and discharge test was conducted for the evaluation cell obtained in Examples 1 to 6 and Comparative Example. The charge and discharge test was conducted in the conditions of, under the environment at 140° C., the currency of 50 μA/cm², and the voltage of 0 V to –2.5 V (0 V to –2.7 V for Comparative Example). Also, whether short circuit occurred or not was confirmed when the evaluation cell was charged. The results are shown in FIGS. 4A to 4F, FIGS. 5A and 5B, and Table 2. Incidentally, FIG. 5B is an enlarged view of the charge curve in the vicinity of 0 mAh to 0.3 mAh in FIG. 5A.

As shown in FIGS. 4A to 4F, in Examples 1 to 6 using the anode active material having the composition represented by $La_{(1-x)}Sn_xF_{(3-x)}$, in which $0.1 \leq x \leq 0.8$, short circuit did not occur when the evaluation cell was charged. On the other hand, as shown in FIGS. 5A and 5B, in Comparative Example using $LaF_3$ as the anode active material, the voltage became disordered when the charge reached in the vicinity of 0.15 mAh, and the minute occurrence of short circuit was confirmed. From this result, it was confirmed that the reduction decomposition of the solid electrolyte occurred in Comparative Example.

From FIGS. 4A to 4F and FIGS. 5A and 5B, it was confirmed that the charge potential and the discharge potential in all Examples 1 to 6 were higher than those of Comparative Example. Also, it was confirmed that the charge potential of the anode layer was made higher than the reduction potential of the solid electrolyte in Examples 1 to 6.

Incidentally, the reduction potential of the solid electrolyte ($La_{0.9}Ba_{0.1}F_{2.9}$) was –2.4 V (vs. $Pb/PbF_2$). From the results of Examples 1 to 6 and Comparative Example, it was confirmed that the anode active material having the composition in which a Sn element was further added to $LaF_3$ had higher defluorination potential thereof than that of the solid electrolyte having the composition in which a Ba element was further added to $LaF_3$. Presumable reason therefor is that, while the potential of a Ba element is close to that of a La element, a Sn element has the potential higher in 2 V or more than that of a La element, and thus the change in defluorination potential occurred due to the difference of the elements.

As shown in FIGS. 4A to 4F, for Examples 3 to 6, the discharge capacity and the charge capacity were higher in two times or more than those for Examples 1 and 2, and remarkable improvement was confirmed.

Figure 6:
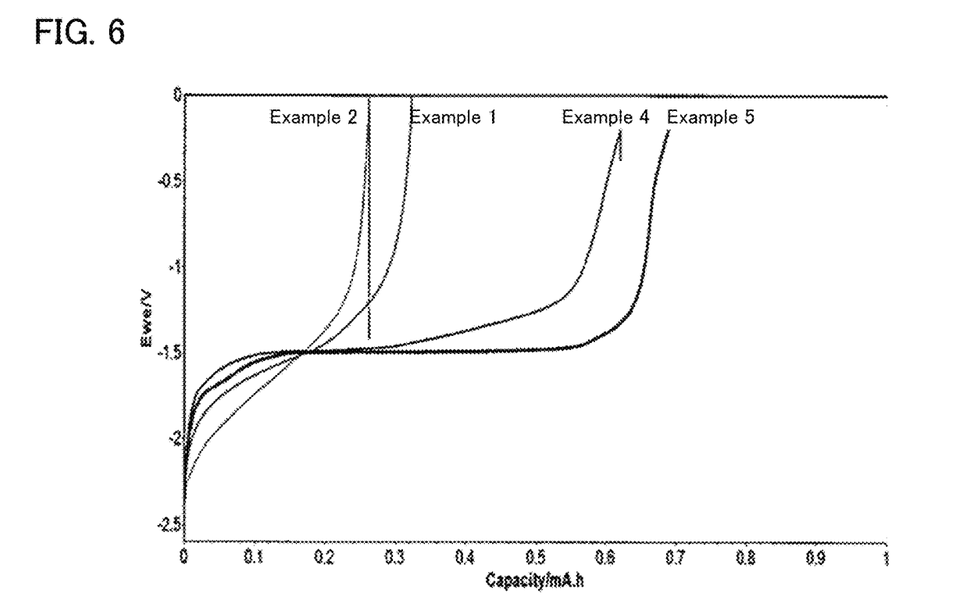
FIG. 6 is the result of a comparison among the discharge curves for the evaluation cells obtained in Examples 1, 2, 4 and 5.
Figures 7A, 7B:
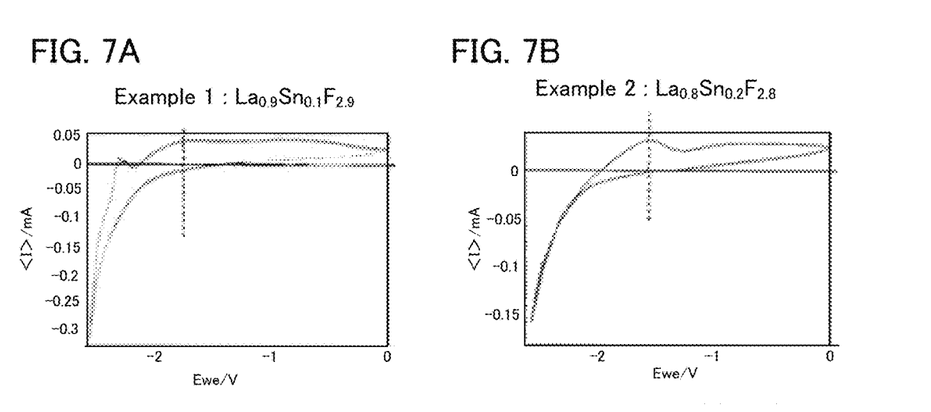
FIGS. 7A to 7F are the result of a cyclic voltammetry test for the evaluation cell obtained in Examples 1 to 6.
Figures 7C, 7D:
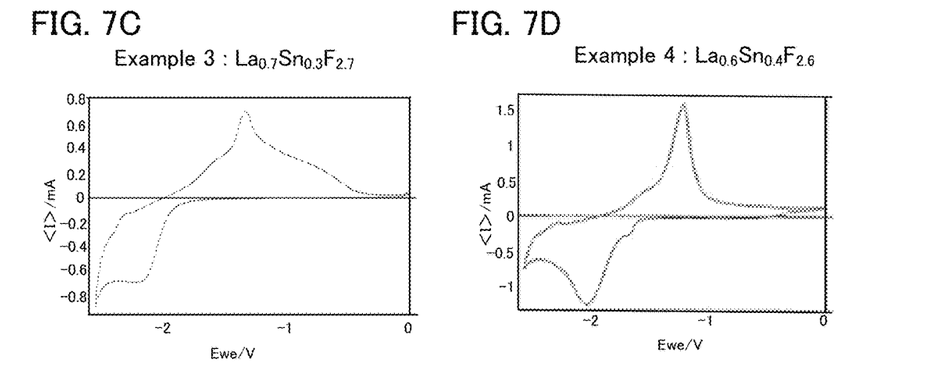
Figures 7E, 7F:
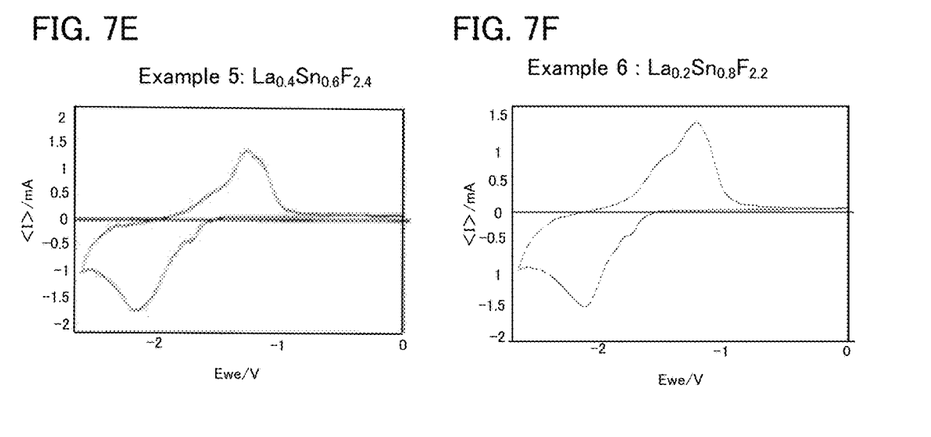

Incidentally, the discharge curves for Examples 1, 2, 4, and 5 are compared in FIG. 6.

Cycle Property

A cycle property test was conducted for the evaluation cell obtained in Examples 1 to 6. Charge and discharge were repeated for 5 cycles in the same conditions as those for the charge and discharge test, and the proportion of the capacity after 5 cycles with respect to the initial capacity was calculated as the capacity maintenance rate. The result is shown in Table 2.

For all the evaluation cells in Examples 1 to 6, it was confirmed that high cycle property of approximately 70% was shown. Also, for Examples 4 to 6, it was confirmed that the cycle property was remarkably improved to 95% or more. Also, for Examples 5 and 6, the cycle property exceeds 100% since the capacity was presumably improved by the uniform dispersion of the La element and the Sn element during the repeated charge and discharge.

Ion Conductivity of Anode Active Material

The fluoride ion conductivity at 140° C. (S/cm) of the anode active material obtained in Examples 1 to 6 and Comparative Example was measured by the measurement method explained in the section "1. Anode layer" described above. The result is shown in Table 2.

As shown in Table 2, it was confirmed that the fluoride ion conductivity for Examples 1 to 6 were higher than that for Comparative Example. Also, it was confirmed that the fluoride ion conductivity for Examples 3 to 6 was higher in 1 digit or more than that for Examples 1 and 2. One of the presumable factors of the improvement in charge and discharge capacity for Examples 3 to 6 is the high fluoride ion conductivity.

TABLE 2

| | Anode layer | Short circuit occurrence | Discharge potential (v.s. $Pb/PbF_2$) | Charge potential (v.s. $Pb/PbF_2$) | Ion conductivity of anode (S/cm)@140° C. | Cycle property (%) |
|---|---|---|---|---|---|---|
| Example 1 | $La_{0.9}Sn_{0.1}F_{2.9}$ | None | –1.8 V | –2.3 V | $3.1 \times 10^{-6}$ | 73.3 |
| Example 2 | $La_{0.8}Sn_{0.2}F_{2.8}$ | None | –1.6 V | –2.3 V | $3.1 \times 10^{-5}$ | 68.9 |
| Example 3 | $La_{0.7}Sn_{0.3}F_{2.7}$ | None | –1.6 V | –2.2 V | $3.0 \times 10^{-4}$ | 72.9 |
| Example 4 | $La_{0.6}Sn_{0.4}F_{2.6}$ | None | –1.5 V | –2.0 V | $5.0 \times 10^{-4}$ | 95.4 |
| Example 5 | $La_{0.4}Sn_{0.6}F_{2.4}$ | None | –1.5 V | –1.8 V | $2.5 \times 10^{-3}$ | 129 |
| Example 6 | $La_{0.2}Sn_{0.8}F_{2.2}$ | None | –1.5 V | –1.8 V | $2.7 \times 10^{-3}$ | 130 |

TABLE 2-continued

| | Anode layer | Short circuit occurrence | Discharge potential (v.s. Pb/PbF$_2$) | Charge potential (v.s. Pb/PbF$_2$) | Ion conductivity of anode (S/cm)@140° C. | Cycle property (%) |
|---|---|---|---|---|---|---|
| Comparative Example | LaF$_3$ | Occurred | −2.3 V | −2.6 V | 1.8 × 10$^{-6}$ | — |

Cyclic Voltammetry Measurement

A cyclic voltammetry (CV) measurement was conducted for the evaluation cell obtained in Examples 1 to 6. The conditions for sweeping were the potential scanning range of −2.5 V (vs. Pb/Pb$_2$) to 0 V (vs. Pb/Pb$_2$) and the potential scanning speed of 1.0 mV/sec. The results are shown in FIGS. 7A to 7F.

As shown in FIGS. 7A to 7F, it was confirmed that the oxidation reduction reaction (charge and discharge reactions) occurred in the evaluation cells obtained in Examples 1 to 6, and thus the function as a battery was confirmed. In particular, for Examples 3 to 6, the oxidation current peak (in the vicinity of −2.2V (vs. Pb/Pb$_2$) to −2 V (vs. Pb/Pb$_2$)) and the reduction current peak (in the vicinity of −1.2 V (vs. Pb/Pb$_2$) to −1 V (vs. Pb/Pb$_2$)) were clearly confirmed, and thus the favorable function as a battery was suggested.

XRD Measurement

Figure 8:
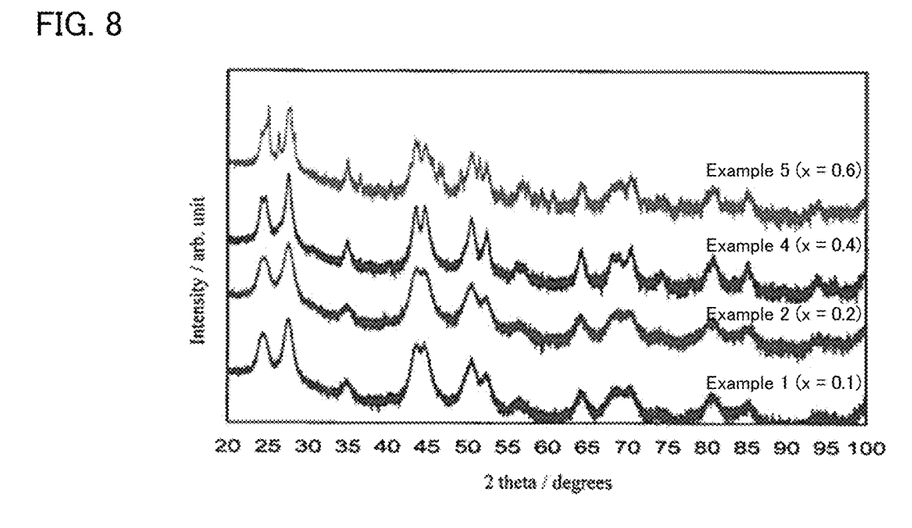
FIG. 8 is the result of an XRD measurement for the anode active material obtained in Examples 1, 2, 4 and 5.

A powder XRD measurement was conducted for the anode active material in Examples 1, 2, 4, and 5 by filling the material in an XRD glass holder. The measurement was conducted using CuKα ray, in 2θ=20° to 100°, and at the scanning rate of 10°/min. The result is shown in FIG. 8.

For all the anode active materials in Examples 1, 2, 4, and 5, the peaks were confirmed in the vicinity of the peak positions of 2θ for La$_{0.9}$Ba$_{0.1}$F$_{2.9}$. This peak is presumed to be the peak derived from the crystal phase having a Tysonite structure and containing a La element and an F element.

Also, for the anode active material in Example 5, the peak of a byproduct was confirmed.

REFERENCE SIGNS LIST 1 cathode layer
2 anode layer
3 solid electrolyte layer
10, 20 fluoride ion battery

What is claimed is:

1. A fluoride ion battery, comprising a cathode layer, an anode layer, and a solid electrolyte layer formed between the cathode layer and the anode layer;
   wherein the anode layer contains an anode active material having a composition represented by La$_{(1-x)}$Sn$_x$F$_{(3-x)}$, in which 0.1≤x≤0.8; and
   the solid electrolyte layer contains a solid electrolyte including a crystal phase of a Tysonite structure.

2. The fluoride ion battery according to claim 1, wherein the anode active material has a composition represented by La$_{(1-x)}$Sn$_x$F$_{(3-x)}$, in which 0.3≤x≤0.8.

3. The fluoride ion battery according to claim 1, wherein a reduction decomposition potential of the solid electrolyte is −2.4 V (vs. Pb/PbF$_2$) or less.

* * * * *